G. E. WILSON.
WRIST PIN AND FASTENER FOR PISTONS.
APPLICATION FILED OCT. 13, 1911.

1,054,262.

Patented Feb. 25, 1913.

Witnesses:
E. C. Skinkle
A. H. Opsahl

Inventor:
G. E. Wilson
By his Attorneys

UNITED STATES PATENT OFFICE.

GEORGE E. WILSON, OF STILLWATER, MINNESOTA, ASSIGNOR TO M. RUMELY COMPANY, OF LAPORTE, INDIANA, A CORPORATION OF INDIANA.

WRIST-PIN AND FASTENER FOR PISTONS.

1,054,262.

Specification of Letters Patent.

Patented Feb. 25, 1913.

Application filed October 13, 1911. Serial No. 654,497.

*To all whom it may concern:*

Be it known that I, GEORGE E. WILSON, a citizen of the United States, residing at Stillwater, in the county of Washington and State of Minnesota, have invented certain new and useful Improvements in Wrist-Pins and Fasteners for Pistons; and I do hereby declare the following to be a full, clear, and exact description of the invention, such as will enable others skilled in the art to which it appertains to make and use the same.

My invention has for its object to provide an improved wrist pin and fastener for engine pistons, and is especially adapted for use in connection with explosive engines which usually have the crank rod connected directly to the interior of the piston.

Generally stated, the invention consists of the novel construction and arrangement of parts hereinafter described and defined in the claims.

In explosive engines, it has been found extremely difficult to so securely connect a wrist pin to a piston that it will not loosen up and move from its proper set position under the continuous pounding action produced in the explosive action. In the first place, it is not desirable that the wrist pin be driven into the piston under great pressure or friction, and even when it is, it soon loosens, and, by contact with the cylinder, wears a groove therein and thereby soon puts the engine in bad running order.

In accordance with my invention, I provide the piston with the tubular wrist pin of such fit that it may be normally easily inserted in its seat in the piston or removed therefrom, and in connection with this tubular wrist pin, I provide an expanding device for distorting the seated ends thereof, out of true circular form, so that it will tightly fit in its seats in the piston.

The preferred arrangement of the invention is illustrated in the accompanying drawings wherein like characters indicate like parts throughout the several views.

Figure 1:
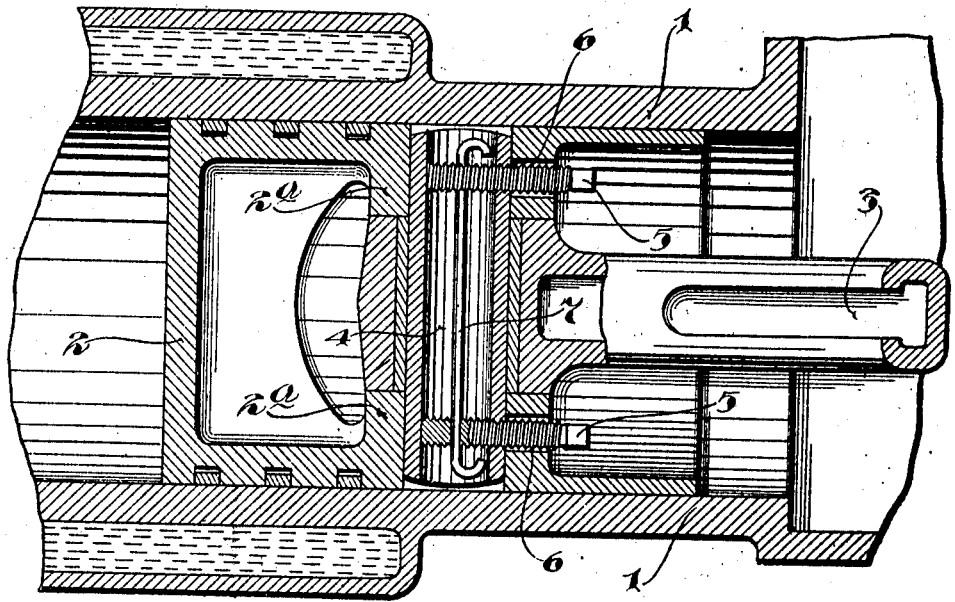
Figure 2:
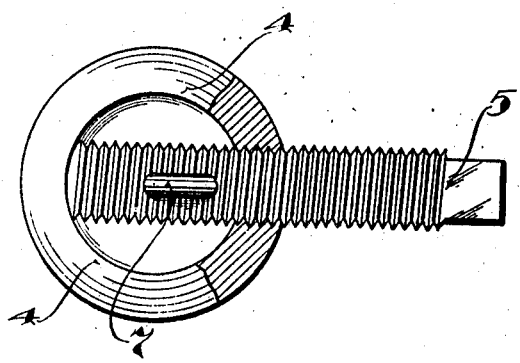

Referring to the drawings, Figure 1 is a horizontal section with some parts broken away showing the improved wrist pin and fastener applied to the piston of an ordinary engine; Fig. 2 is a detail view with some parts sectioned showing the bushing in end elevation and showing the expanding device applied thereto.

Of the parts of the explosive engine, the numeral 1 indicates the cylinder, the numeral 2 the piston and the numeral 3 the crank rod. The piston 2, as is customary, is provided with diametrically opposite transversely spaced intermediately projecting wrist pin seats $2^a$, between which the inner head of the crank rod 3 closely fits.

The tubular wrist pin 4 is preferably made from steel tubing and its ends quite closely fit within the seats $2^a$. For distorting or expanding in one direction, the ends of the tubular wrist pin 4, I provide set screws 5 that are screw-threaded through one wall of the said wrist pin, and impinge against the inner surface of the diametrically opposite wall. The projecting ends of these set screws are passed loosely through clearance passages 6 in the pin seats $2^a$ of the piston.

When the set screws 5 are tightened, it is evident that they will expand the ends of the wrist pin in the plane of the said set screws, and thereby tighten the said wrist pin within its seats $2^a$ under very great friction. The set screws should be arranged to thus expand the ends of the wrist pin on lines parallel to the direction of movements of the piston, and hence, directly in the line of the strains produced by the explosions in the engine cylinder.

Of course, when the ends of the wrist pin are expanded in the direction stated, they will be slightly contracted in a direction at right angles thereto, but this has no detrimental effect because the ends of the sleeve are tightly held in the direction in which the strains are applied to the wrist pin. The set screws are capable of being screwed so that there is no possibility of the wrist pin becoming loose unless, of course, the set screws should turn, and themselves loosen up. To prevent this, a key or lock pin 7 is preferably provided through perforations in the said set screws, and its ends bent to prevent it from working out of position. The ends of the wrist pin are also preferably rounded off on the arc of the cylinder surface so that if the wrist pin should not have been properly set or sufficiently expanded to hold it tight, the ends of the said wrist pin would not wear the cylinder rapidly, even if engaged therewith. The set screws 5, it will be noted, have no engagement with the piston and do not react against the same directly but, in both directions, reacts directly against the opposite sides of the ends of the wrist pin.

In actual usage, this improved wrist pin and fastener have been found highly satisfactory in all respects.

What I claim is:

1. The combination with a tubular wrist pin having contiguous unbroken completely cylindrical ends, of a set screw having threaded engagement with one wall thereof and impinging against the inner surface of the opposite wall, for expanding the same in the direction of said set screw, substantially as described.

2. The combination with a tubular wrist pin, of a set screw applied to the ends thereof, and having end engagement with one side of said wrist pin and impinging against the inner surface of the opposite side thereof, for expanding the ends of the said wrist pin in the direction of said set screw, substantially as described.

3. The combination with a tubular wrist pin having contiguous unbroken completely cylindrical ends, of a set screw applied to the ends thereof, and having end engagement with one side of said wrist pin and impinging against the inner surface of the opposite side thereof, for expanding the ends of the said wrist pin in the direction of said set screw, and a lock pin extended through perforations in said set screws and holding the same against rotation.

4. In an engine, the combination with a piston having inwardly projecting pin seats, of a tubular wrist pin having contiguous unbroken completely cylindrical ends with its ends in said pin seats, and set screws having threaded engagement with one side of the ends of said wrist pin, and impinging against the inner surface of the opposite sides thereof, for expanding the ends of said wrist pin in the direction of said set screws within said seats, substantially as described.

5. In an engine, the combination with a piston having inwardly projecting pin seats, of a tubular wrist pin having contiguous unbroken completely cylindrical ends with its ends in said pin seats, and set screws having threaded engagement with one side of the ends of said wrist pin, and impinging against the inner surface of the opposite sides thereof, for expanding the ends of said wrist pin in one direction within said seats, and a lock pin inserted through perforations in the said set screws, substantially as described.

In testimony whereof I affix my signature in presence of two witnesses.

GEORGE E. WILSON.

Witnesses:
BERNICE G. WHEELER,
HARRY D. KILGORE.